United States Patent [19]

Dougherty

[11] Patent Number: 5,137,681

[45] Date of Patent: Aug. 11, 1992

[54] METHOD AND APPARATUS FOR RECYCLING TURBINE EXHAUST STEAM IN ELECTRICAL POWER GENERATION

[76] Inventor: Michael Dougherty, 1113 Ormond Ave., Drexel Hill, Pa. 19026

[21] Appl. No.: 527,761

[22] Filed: May 23, 1990

[51] Int. Cl.⁵ .............................................. G21C 7/32
[52] U.S. Cl. ...................................... 376/211; 60/670
[58] Field of Search ............... 376/207, 210, 211, 378; 60/670, 689, 685

[56] References Cited

U.S. PATENT DOCUMENTS

| | | | |
|---|---|---|---|
| 1,066,348 | 7/1913 | Voorhees | 60/649 |
| 4,193,266 | 3/1980 | Frutschi | 376/211 |
| 4,239,603 | 12/1980 | Egosi | 60/648 |
| 4,479,354 | 10/1984 | Cosby | 60/670 |

Primary Examiner—Michael J. Carone
Attorney, Agent, or Firm—Frank J. Benasutti

[57] ABSTRACT

An electrical generating system in which exhaust steam from the turbine is recycled through the turbine to reduce feedwater requirements and condenser complexity. The turbine is an axial flow dual shaft compressor/turbine unit in which a coaxial shaft couples the turbine section to the compressor section. A portion of the energy extracted from the steam is used to power the generator and the remainer is used to power the compressor. The turbine exhaust steam is directed through compressor section and the compressed steam is then mixed with turbine inlet steam by a steam jet ejector. The compressor may be powered from either one or both shafts from the turbine.

5 Claims, 4 Drawing Sheets

METHOD AND APPARATUS FOR RECYCLING TURBINE EXHAUST STEAM IN ELECTRICAL POWER GENERATION

BACKGROUND OF THE INVENTION

1. Field Of The Invention

This invention relates to an improvement in steam power plants for the generation of electricity, and in particular to reducing feed water requirements and condenser complexity by mechanically compressing power turbine exhaust steam to be recycled to the turbine.

2. Description of the Prior Art

Although there are many variations of controls and operating elements in steam power plants, the basic elements include a thermal steam source, steam turbines, generators, and one or more condensers to reclaim the turbine exhaust as hot feed water. Various pressure controls and the recycling of dry turbine exhaust steam to super heater tubes are well known variations to the basic power plant to control operating conditions and increase thermal efficiency.

Re-compression of turbine exhaust steam by mechanical means to be recycled to the power turbine has not been previously been included in such systems, as the mechanical energy used in compression cannot be entirely extracted as work energy by the turbine, resulting in a net energy loss. However, particularily with nuclear fueled power plants, the large quantities of cooling water and boiler feed water required are, in many locations, more critical limitations than thermal efficiency. Consequently, in such locations it may be advantageous to sacrifice optimum thermal efficiency in order to reduce water requirements. An objective of the present invention is to reduce feed water requirements in the steam loop, and by so doing, also reduce the size and complexity of the condensers.

Although mechanically compressed turbine exhaust steam has not previously been used for this purpose, it has been known to mechanically compress steam engine exhaust for auxiliary purposes, such as described in U.S. Pat. No. 1,066,348 to G. T. Voorhees, which describes mechanically compressed exhaust steam utilized for auxiliary heating systems, such as moisture absorption generators. Similarly, U.S. Pat. No. 4,239,603 describes the use of a turbo compressor heat engine to re-pressure a portion of the process vapor from a steam ejection vacuum cooling or drying system, thereby reducing the fuel costs associated with condensing the vapor and regenerating the steam in a boiler.

Gas turbine power plants typically extract a portion of turbine power to compress the inlet air prior to combustion, as the work extracted for compression is more than recouped by the increased combustion efficiency. It is also known in gas turbine technology, particularly turbo-prop and turbofan aircraft engines, to use a coaxial dual shaft for the turbine-compressor drive linkage, to accommodate different rotating speeds for the high and low pressure extraction/compression stages.

It is an objective of this invention to utilize a dual shaft compresser-turbine in a steam power plant to re-compress the turbine exhaust steam, and to recycle it to the turbine inlet in order to reduce the amount of condensation and steam generation required in the system cycle, thereby sacrificing some thermal efficiency in order to decrease feed water requirements and condenser size and complexity.

SUMMARY OF THE INVENTION

In the apparatus of the present invention, a steam power plant includes dual shaft turbine-compressor as the power extraction turbine. The turbine exhaust steam is passed through a dryer and then introduced to the compressor section, where its pressure is raised by mechanical compression, and then is mixed with fresh steam by jet ejectors. The mixed steam is thereafter routed to the turbine inlet.

In the method of generating electricity by the present invention, dry high pressure steam is generated by a thermal source, is mixed with re-compressed turbine exhaust steam by jet ejectors, and the mixed steam is input to the turbine section of a coaxial dual shaft turbine-compressor. Thermal energy is extracted from the mixed steam by the turbine section and converted into mechanical energy. A portion of the mechanical energy is used to drive an electrical generator and the remaining mechanical energy is used to re-compress turbine exhaust steam. The turbine exhaust steam is passed through a dryer to eliminate moisture, and the dried exhaust steam is routed to the compressor section. The compressor mechanically raises steam pressure, and such re-compressed steam is routed to the jet ejectors to be mixed with fresh steam.

DETAILED DESCRIPTION OF THE PREFERRED EMBODIMENT

Figure 1:
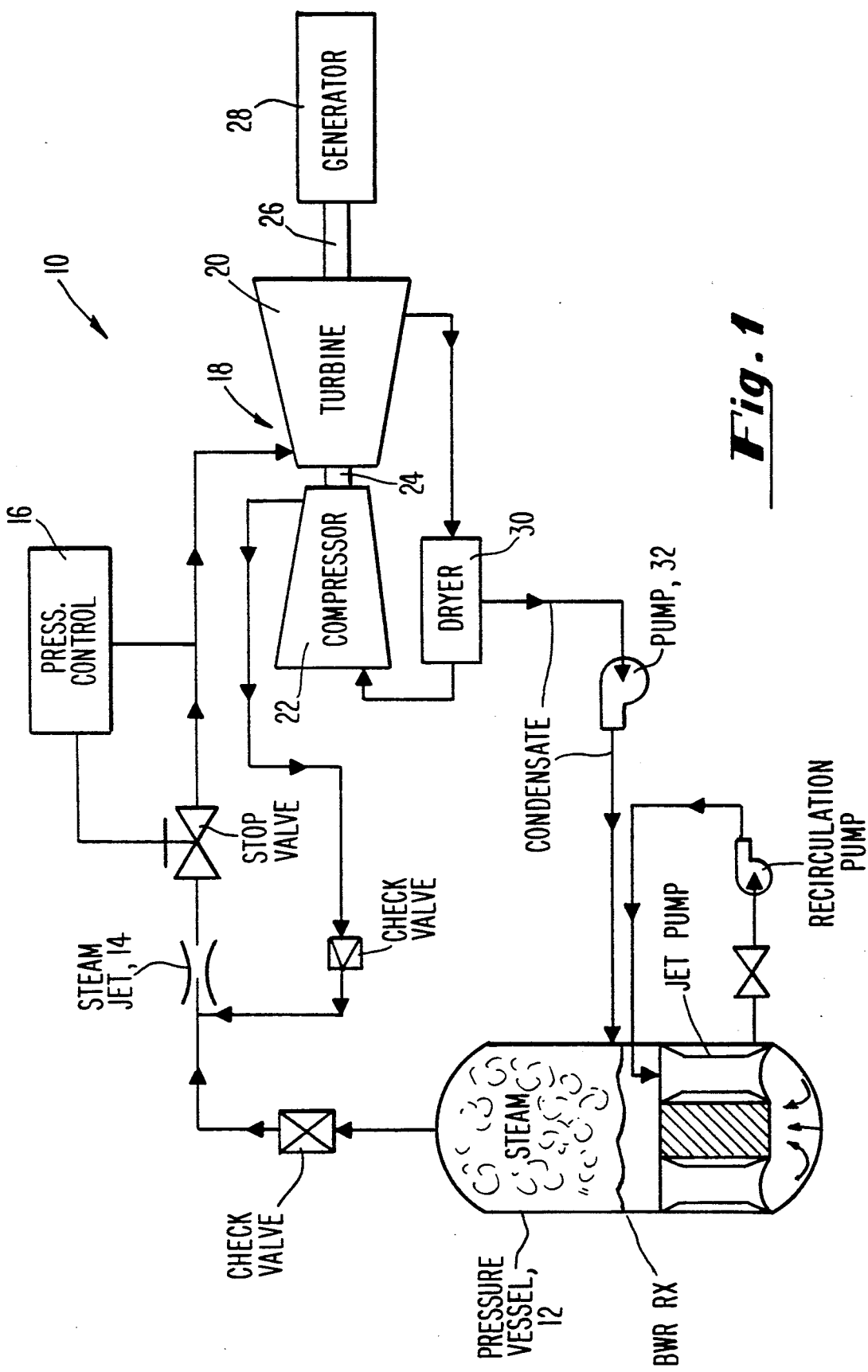
FIG. 1 is a schematic diagram of a steam powered electrical generation system according to the invention.

In the schematic illustration of an electrical power generation system according to the present invention, as depicted in FIG. 1, an electrical power generating system 10 utilizes high pressure steam from a thermal steam generator 12. Various types of such steam generators are well known, and the particular type is not significant to the invention. The steam generator 12 exchanges heat to condensate and fresh feed water to produce dry high pressure steam, typically in the ranges of 900°–1000° F. at 1,000 psi.

In the depicted system, the high pressure steam is routed via appropriate control valves to a steam jet ejector 14, where it is mixed with re-compressed turbine exhaust steam, as more fully described hereafter. The mixed steam is regulated at a steady pressure by a servo-pressure control valve device 16. Such devices are well known to those skilled in the art.

The regulated mixed steam is then routed to the turbine inlet of a coaxial dual shaft compresser-turbine 18. The compresser-turbine 18 is more fully depicted in FIG. 2, but as shown schematically in FIG. 1, comprises a turbine section 20, a compressor section 22, and a dual shaft 24 which couples the turbine section 20 to the compressor section 22. A power output shaft 26 transmits rotational energy from the turbine section 20 to an electrical generator 28.

Figure 3:
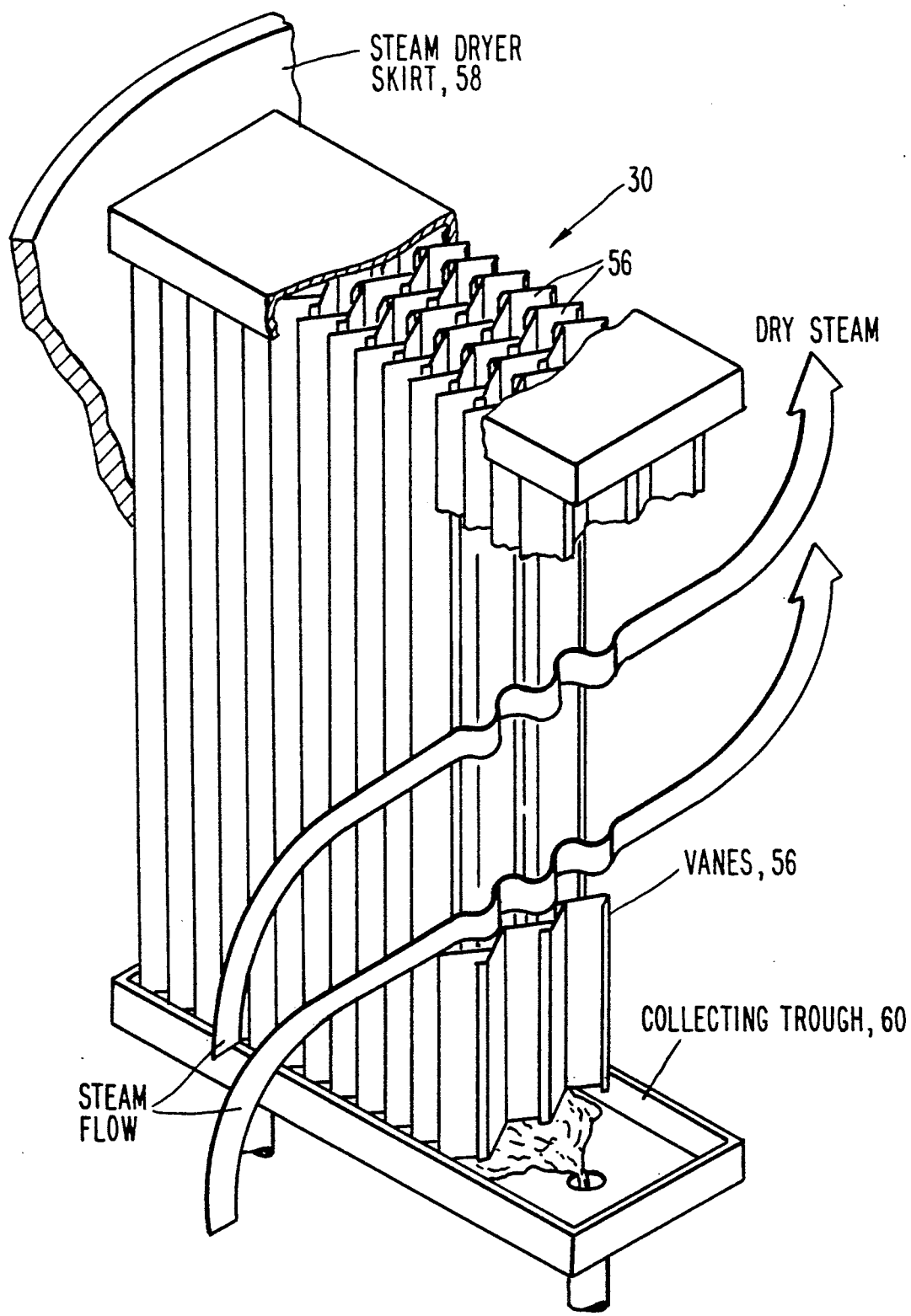
FIG. 3 is a schematic diagram of a representative steam dryer depicted as 30 in FIG. 1.

Exhaust steam from the turbine section 20 is routed to a dryer 30, which is more fully depicted in FIG. 3. The dryer 30 removes moisture from the turbine exhaust and passes the dried exhaust steam to the inlet of the compressor section 22. The hot water extracted from the dryer 30 is withdrawn through pump 32 and routed back to the steam generator 12 as system condensate.

The dry exhaust steam from the dryer 30 is compressed by compressor 22, is extracted from the compressor 22 and passed to a steam jet ejector 14, where it is mixed with fresh steam from steam generator 12. The steam jet ejector 14 is more fully described in FIG. 4.

Figure 2:
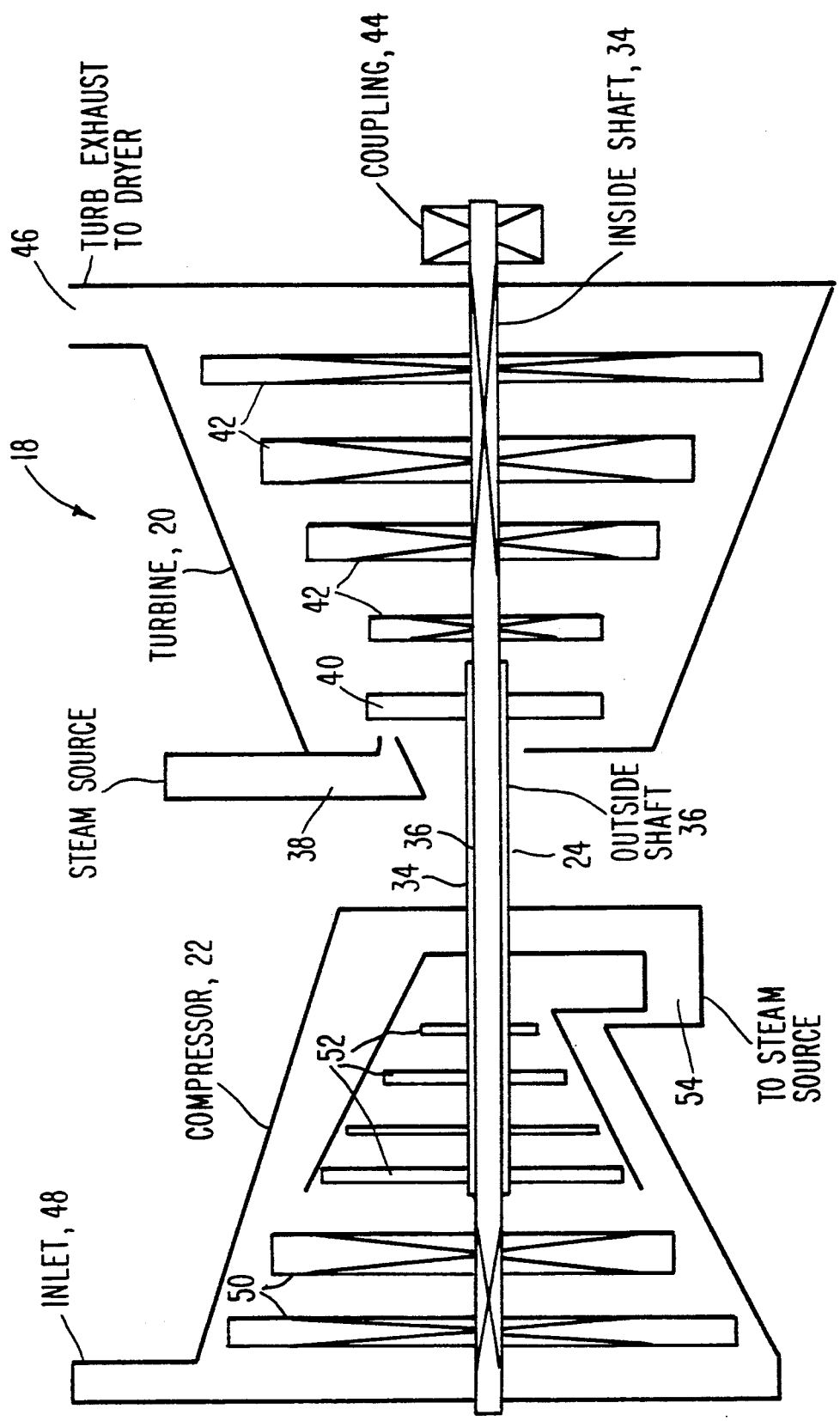
FIG. 2 is a schematic diagram of a cross section of a dualshaft turbine- compressor depicted as 18 in FIG. 1.

Turning now to FIG. 2, the turbo-compressor 18 is more fully illustrated. The shaft 24 coupling the turbine section 20 to the compressor section 22 is a coaxial dual shaft, comprising a high pressure shaft 34 disposed concentrically around an intermediate section of a low pressure shaft 36, allowing the two shafts to rotate at different speeds. Mixed steam is inlet to the turbine section 20 at the turbine inlet 38, and passes first through a high pressure turbine blade wheel 40, which extracts thermal energy and converts it to rotational mechanical energy transmitted to the high pressure shaft 34. Although a single high pressure turbine wheel 40 is depicted, there may be one or more such high pressure turbine wheels connected to the high pressure shaft 34, as is well known to those in the art. Additionally, there will be stator blades (not depicted) interspersed between the rotating turbine wheels, as well known in the art. After passing through the high pressure turbine wheel 40, the mixed steam is passed through a series of low pressure turbine wheels 42. Four such low pressure wheels 42 are depicted in FIG. 2, although the number of low pressure wheels is not critical to the invention and, as well known to those in the art, a different number of wheels may be utilized. The low pressure wheels 42 are mounted on the low pressure shaft 36, and extract thermal energy from the steam and convert the same to rotating mechanical energy. Low pressure shaft 36 is connected to output shaft 26 by an appropriate coupling 44, and provides the motive power for generator 28.

Exhaust steam is extracted from the turbine section 20 at the turbine exhaust duct 46, and routed to dryer 30 as previously described. The dry exhaust steam from dryer 30 is then routed to the compressor section 22 at its inlet 48, and passes initially through low pressure compressor blades 50. Low pressure blades 50 are blade wheels mounted on the low pressure shaft 36, and thereby received motive power from turbine wheels 42 through shaft 36. The compressed steam is then passed through high pressure compressor blade wheels 52, which are mounted on shaft 34 and receive power from turbine wheel 40 through shaft 34. Stator blades (not depicted) are interspersed between the compressor blade wheels. The sequential compressor stages of wheels 50 and 52 progressively compress the dried exhaust steam, and discharge it as high pressure steam from the compressor discharge duct 54.

As shown in FIG. 3, dryer 30 comprises a labrynth of metal vanes 56 enclosed in a dryer hood 58. The exhaust steam is passed through the vanes 56, which collect moisture from the steam and allow it to drip as hot condensate into a collecting trough 60 beneath the vanes. The exhaust steam emerges from the vanes in a dry condition, while the hot condensate is extracted from the collecting trough 60 and pumped back to the steam generator 12 as condensate, as previously described.

Figure 4:
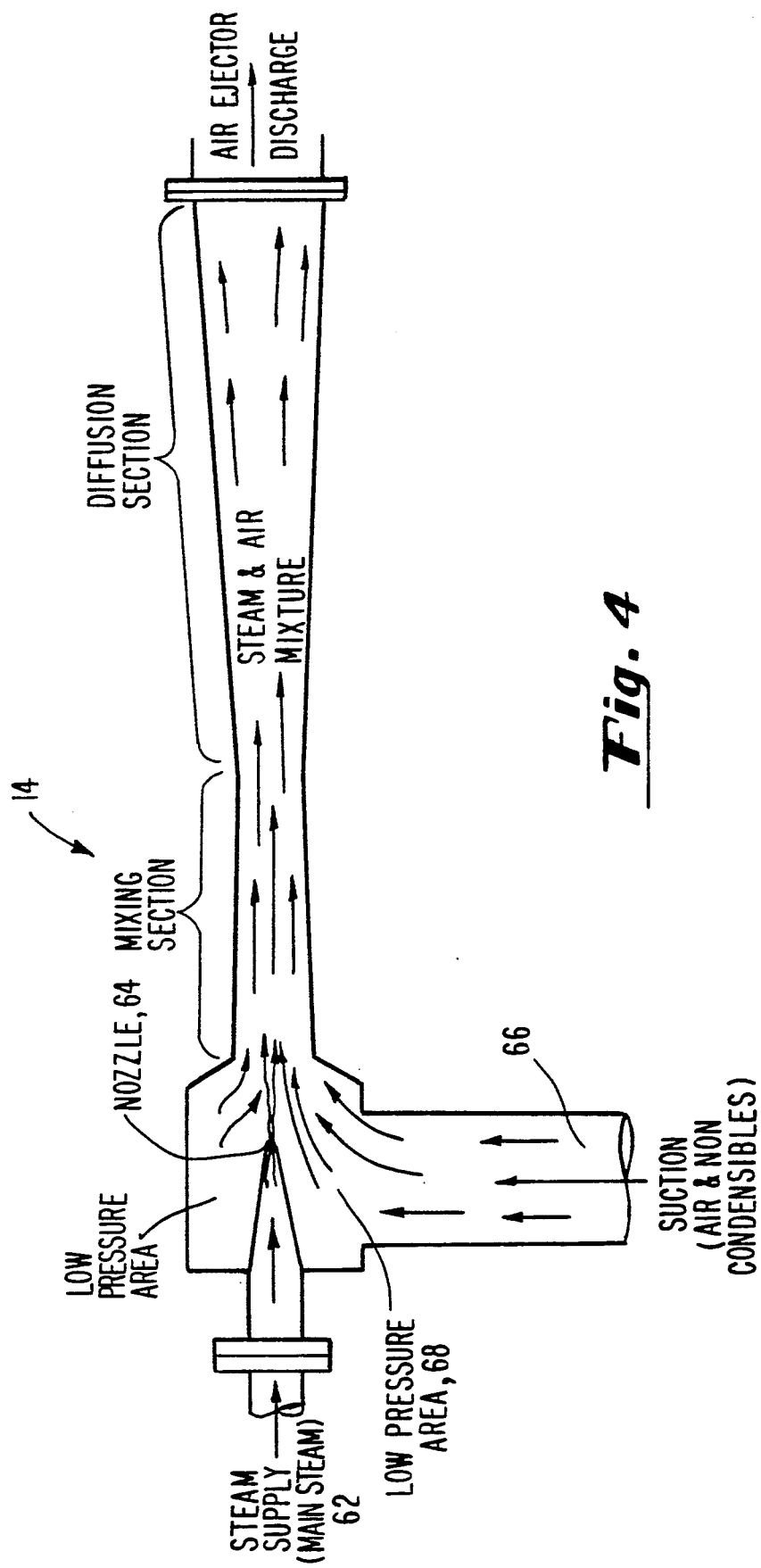
FIG. 4 is a schematic diagram of a representative steam jet ejector depicted as 14 in FIG. 1.

As shown in FIG. 4, the steam jet ejector 14 receives fresh steam from the steam generator 12 at inlet 62 and passes it through a nozzle 64 to increase its velocity. Dry exhaust steam is input to the ejector at inlet 66 and enters a low pressure manifold 68 which encloses the nozzle 64. The venturi effect of the nozzle 64 and manifold 68 pumps the dry exhaust steam through the air ejector discharge 68, and mixes both fresh steam and recycled exhaust steam at an equilibrium pressure, which is regulated by servo-pressure control valve 16, to be used by the turbine section of the turbo-compressor.

What is claimed:

1. An electrical generating system of the type in which a steam turbine is used to convert steam energy into rotational mechanical energy to drive an electrical generator, wherein:

the turbine is an axial flow, dual shaft compressor/turbine unit comprising a turbine section, a compressor section, and a coaxial dual shaft coupling the turbine section to the compressor section;

a portion of steam energy extracted by the turbine section is used to power the compressor section and the remaining extracted energy is used to power the generator, and;

further comprising means for routing turbine exhaust steam from the turbine section to the compressor section and means for mixing the compressed steam from the compressor section with turbine inlet steam.

2. A generating system as in claim 1, wherein the dual shaft includes a secondary shaft disposed concentrically around an intermediate section of a primary shaft, the turbine section includes a plurality of turbine blade wheels of which one or more turbine blade wheels are mounted on the secondary shaft and the remaining turbine blade wheels are mounted on the primary shaft, and the compressor section includes a plurality of compressor blade wheels of which one or more of the compressor blade wheels are mounted on the primary shaft and the remaining compressor blade wheels are mounted on the secondary shaft.

3. An apparatus for compressing and recycling turbine exhaust steam to be mixed with turbine inlet steam comprising:

an axial flow steam turbine having multiple pressure reduction stages for extracting mechanical energy from steam, said turbine having a primary power shaft upon which a plurality of turbine wheels are mounted to effect a portion of said pressure reduction stages, said primary power shaft having a power coupling for extracting useful work energy, and a secondary shaft coaxially surrounding an intermediate section of the primary shaft, said secondary shaft having one or more turbine wheels mounted thereon to effect additional pressure reduction stages;

a compressor receiving motive power from at least said secondary shaft;

means for routing exhaust steam exiting said turbine to the inlet of said compressor;

means for mixing compressed steam exiting said compressor with inlet steam to said turbine.

4. An apparatus as in claim 3 further comprising the compressor receiving motive power from both the primary and secondary shafts.

5. A process of generating electricity from steam comprising:

converting steam thermal energy to rotational mechanical energy in a turbine section of a dual shaft turbine-compressor unit;

using a portion of the rotational mechanical energy to power an electrical generator;

using another portion of the rotational mechanical energy to power a compressor section of the turbine compressor unit;

routing exhaust steam from the turbine section to the compressor section;

raising the pressure of the exhaust steam by compression in the compressor section;

mixing compressed steam from the compressor section with fresh steam from a thermal steam source;

introducing the mixed steam into an inlet of the turbine section.

* * * * *